(12) United States Patent
Bögert et al.

(10) Patent No.: US 6,289,696 B1
(45) Date of Patent: Sep. 18, 2001

(54) APPARATUS FOR SEVERING GOBS FROM GLASS STRANDS

(75) Inventors: Hermann Bögert, Auetal; Gerhard Geisel, Bückeburg, both of (DE)

(73) Assignee: The Firm Herman Heye, Obernkirchen (DE)

( * ) Notice: Subject to any disclaimer, the term of this patent is extended or adjusted under 35 U.S.C. 154(b) by 597 days.

(21) Appl. No.: 08/605,212

(22) PCT Filed: Mar. 4, 1995

(86) PCT No.: PCT/EP95/00799

§ 371 Date: Mar. 7, 1996

§ 102(e) Date: Mar. 7, 1996

(87) PCT Pub. No.: WO96/02472

PCT Pub. Date: Feb. 1, 1996

(30) Foreign Application Priority Data

Jul. 16, 1994 (DE) .............................. 94 11 572 U

(51) Int. Cl.⁷ ..................................................... C03B 7/10
(52) U.S. Cl. .................. 65/133; 65/174; 65/176; 65/207; 65/221; 65/325; 65/332; 65/334; 83/564; 83/600; 83/602
(58) Field of Search ............................ 65/133, 332, 325, 65/334, 174, 176, 207, 221; 83/564, 600, 602

(56) References Cited

U.S. PATENT DOCUMENTS

| | | | |
|---|---|---|---|
| 702,634 | * 6/1902 | Coleman, Jr. ........................ | 65/221 |
| 1,692,858 | * 11/1928 | Peiler ................................... | 65/334 |
| 2,518,871 | * 8/1950 | Craig ................................... | 65/334 |
| 2,678,518 | * 5/1954 | Honiss ................................. | 83/600 |
| 3,264,077 | * 8/1966 | Bishop ................................ | 65/133 |
| 3,758,286 | * 9/1973 | Heyne ................................. | 65/133 |
| 4,015,967 | 4/1977 | Ward, Jr. ............................. | 65/133 |
| 4,544,397 | * 10/1985 | Fenton ................................ | 65/334 |
| 5,188,653 | * 2/1993 | Bogert et al. ....................... | 65/334 |
| 5,236,489 | * 8/1993 | Brancati et al. .................... | 65/334 |
| 5,518,515 | * 5/1996 | Blaskowitz et al. ................ | 65/324 |

FOREIGN PATENT DOCUMENTS

| | | |
|---|---|---|
| 4132098 | 9/1991 | (DE) . |
| 4316842 | 5/1993 | (DE) . |
| 1435548 | * 11/1988 | (SU) ..................................... 65/334 |
| WO9401371 | 1/1994 | (WO) . |

* cited by examiner

Primary Examiner—Michael P. Colaianni
(74) Attorney, Agent, or Firm—Synnestvedt & Lechner LLP

(57) ABSTRACT

In an apparatus (1) for the severing of gobs from one or more strands (2;3) of molten glass, the severing of each gob is effected by a shear blade pair (5;6). A shear blade (7,8;9,10) of each shear blade pair is arranged on an associated, pivotably mounted shear arm (11;12). The two shear arms (11;12) are coaxially and freely pivotably mounted relative to each other on a common column (13). Each shear arm is pivotably drivable synchronously in relation to the other by its own separate drive means (24;25).

18 Claims, 2 Drawing Sheets

APPARATUS FOR SEVERING GOBS FROM GLASS STRANDS

FIELD OF THE INVENTION

The invention relates to an apparatus for the serving of gobs from one or more strands of molten glass by a shear blade pair.

In one known apparatus of this type (DE 41 32 098 C1) the pivot movements of the two shear arms are synchronised with one another by a gear mechanism. The pivot movements are effected by the driving of only a first of the shear arms by a drive mechanism. The drive mechanism comprises a crank whose crank pin is connected by means of a coupling rod to the first shear arm. The drive means is arranged on a carriage which is displaceable transversely to a longitudinal dimension of the first shear arm. The gear mechanism is comparatively expensive. Much space is demanded to one side of a plane of symmetry of the shear arms by the drive mechanism and its carriage together with carriage guide brackets. Generally, the shear arm which is not directly driven is biased by a pneumatic piston-cylinder unit.

From WO 94/01371 A1 there is known a parallel shears of a different species. Here, each shear blade is fixed to a carriage. The carriages are drivable linearly back and forth by a common crank drive mechanism. The crank drive mechanism comprises a crankshaft and diametrically opposed connecting rods which are coupled to the crankshaft and which are each coupled at the other end to one of the carriages.

From DE 43 16 842 A1 there is known a pivot shears wherein the two shear arms are pivotally mounted on different axes. A common rack is guided for movement back and forth transversely to the shear arms by means of a hydraulic drive. In engagement with the toothed rack is a pinion with which two driven gearwheels of a gear transmission mesh. To each driven gearwheel is fixed a connecting member which carries a first intermediate link member. A second intermediate link member is coupled to each first intermediate link member and to one of the shear arms.

It is the object of the invention to simplify the apparatus and to improve the kinematics of the cutting movements.

SUMMARY OF THE INVENTION

This object is achieved by the present invention. By virtue of the coaxial mounting of the two shear arms, the spacing between the two bearing shafts in the known coupling gear mechanism between the shear arms is removed. Tolerances and play which occur in the known coupling gear mechanism are excluded. The kinematics of the cutting movements are improved, since both shear arms now pivot about the same axis. The individual drives for the shear arms mean that each drive can be made smaller and lighter and can be more easily fitted.

Each electric servodrive can comprise, in addition to an electric servomotor, a subsequent gear mechanism as required. Both electric servodrives are preferably controllable synchronously by means of a freely programmable electronic control. In order to synchronise the apparatus the electric servodrives can be brought to a standstill in an opened working position for a synchronisation period. The synchronisation period can be made very short.

At least one carriage brings about the particular advantage that one can keep the working stroke of the shear arms to a minimum and consequently reduce driving energy on the one hand and increase the maximum possible operating speed on the other hand. For the rest, the carriage permits a very simple and rapid opening of the shear arms out beyond the opened working position relevant for the working stroke. This further opening is desirable for example if maintenance or exchange of parts has to be carried out on the orifice ring of the feeder bowl. The orifice ring and its surroundings can thus be made freely accessible in a rapid and simple way for servicing purposes. An opening of the shear arms can also take place automatically in the case of a loss of the drive or the driving energy. In this case, the control of the drive means generates a starting pulse for a further control for the reverse driving of the carriage. The shear arms then remain in a opened safety position until the damage to the drive means is repaired or the energy supply is restored. In this way, the shear blades cannot collide with the glass strands.

BRIEF DESCRIPTION OF THE DRAWINGS

Features and advantages of the invention will become apparent from the following description of an embodiment of the invention which is given by way of example and which is shown in the drawings. In the drawings.

DETAILED DESCRIPTION OF EMBODIMENTS OF THE INVENTION

Figure 1:
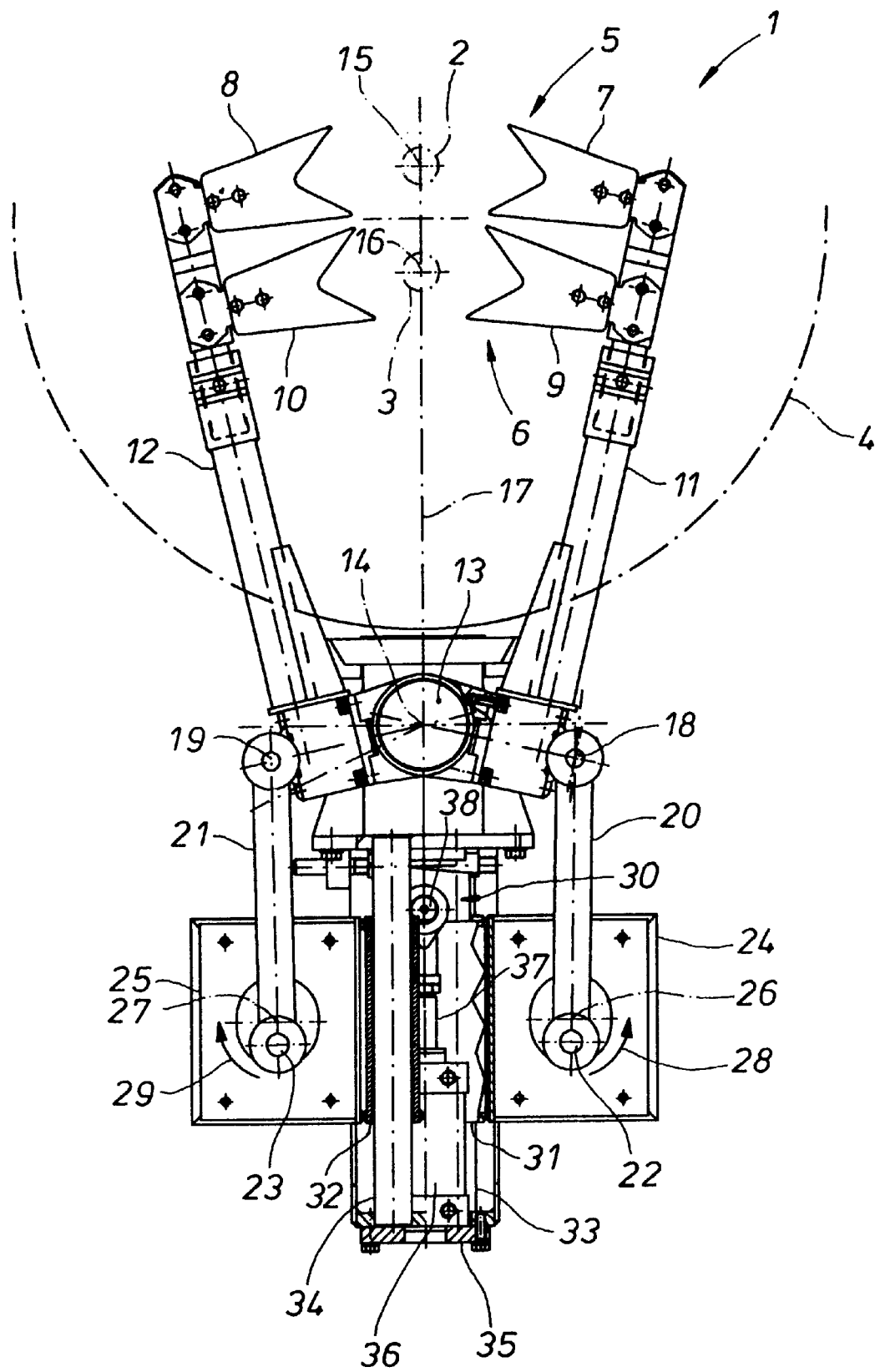
FIG. 1 is the plan view of an apparatus whose shear arms are located in the opened working position.

FIG. 1 shows an apparatus 1 for the severing of gobs from strands 2 and 3 of molten glass. The strands 2, 3 appear from base orifices of a feeder bowl 4 which is known per se. The severing of each gob is effected by a shear blade pair 5 and 6 having shear blades 7, 8 and 9, 10.

Each individual shear blade of each shear blade pair 5,6 is releasably fixed to an associated shear arm 11 and 12. The shear arms 11, 12 are freely pivotably mounted with respect to each other on a common column 13 having a longitudinal axis 14 so that they are coaxial. The strands 2, 3 have longitudinal axes 15 and 16. A plane 17 extends through the longitudinal axes 14 to 16.

At a radial distance from the longitudinal axis 14 there is coupled to each shear arm 11, 12 at a coupling point 18 and 19 a coupling rod 20 and 21 whose other ends are respectively connected to respective crank pins 22 and 23 of a driven crank of drives 24 and 25 formed as electric servodrives and having longitudinal axes 26 and 27. It is advantageous that the crank pins 22, 23 circulate always in the same respective directions of rotation 28 and 29. In the preferred embodiment of the invention, the shear arms 11 and 12 are driven in synchronism. In order to synchronise the apparatus 1, the crank pins 22, 23 are preferably held at a standstill for a short time in the outer dead point positions indicated in FIG. 1.

In this outer dead point position shown in FIG. 1, the shear blades 7 to 10 are each located in their opened working position and consequently at the maximum working distance from the associated longitudinal axes 15, 16. When the crank pins 22, 23 move from the outer dead point position and circulate in the directions of rotation 28, 29, the shear blade pairs 5, 6 close with slight overlapping of the cooperating shear blades 7, 8 and 9, 10, with the result that respective gobs are severed from the strands 2, 3 of the molten glass and are fed to an associated glass forming machine. The amount of this overlap, the so-called overcut of the shear blades, can be adjusted by a stop for that end of a carriage 30 which is adjacent to the column 13. The stop is formed by a transversely adjustable inclined surface of a housing 35 which is fixed to the apparatus.

The drives 24, 25 are arranged on opposite sides of the plane 17 on a common carriage 30 which is movable parallel to the plane 17 by means of guides 31 and 32 on guide rods 33 and 34. The guide rods 33, 34 are mounted in the housing 35 which is fixed to the apparatus. A double-acting pneumatic cylinder 36 is mounted in the end of the housing. A piston rod 37 of the cylinder 36 is coupled centrally at a link point 38 to the carriage 30. An actuation of the cylinder 36 by compressed air therefore causes a displacement of the carriage 30 and consequently of the drives 24 and 25 parallel to the plane 17.

Figure 2:
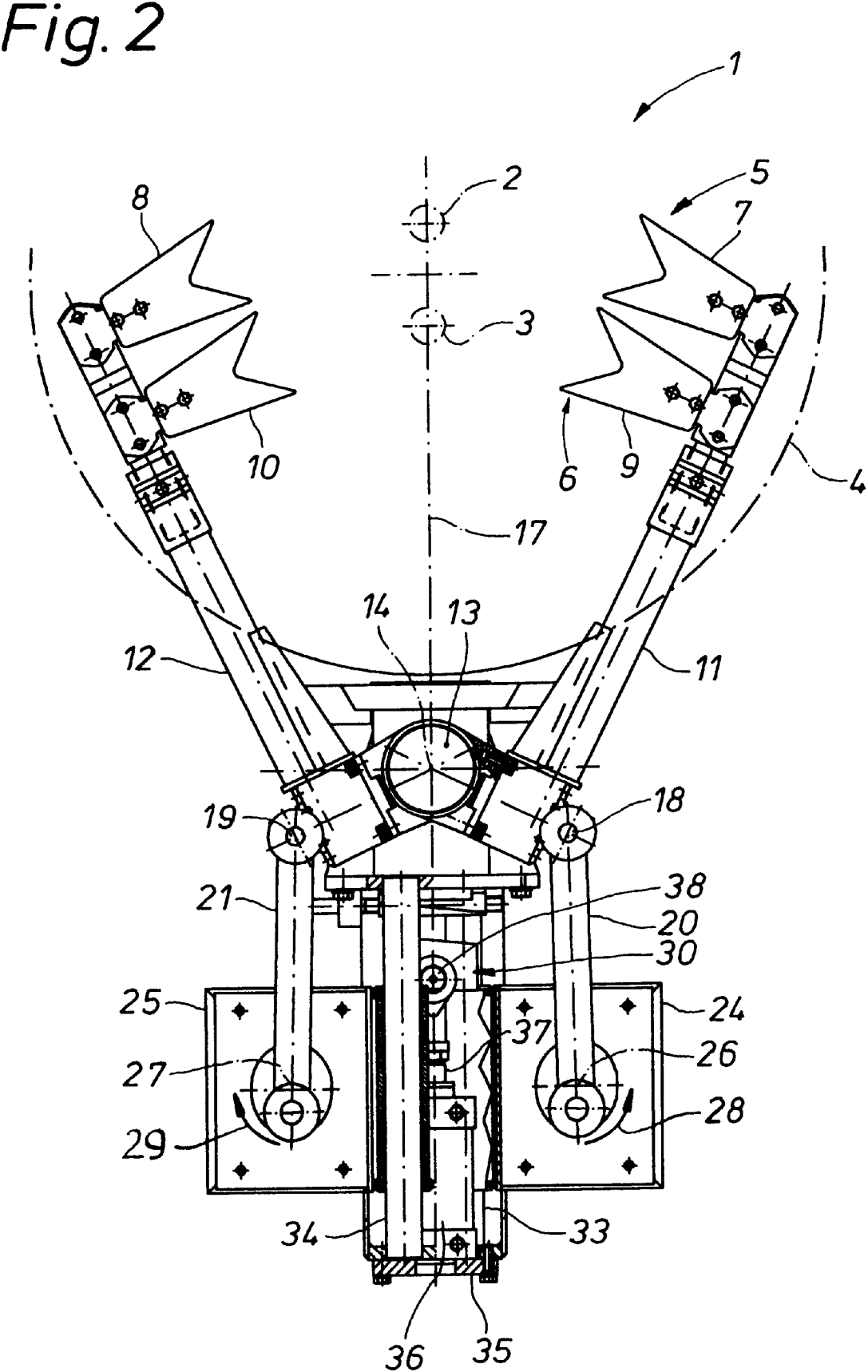
FIG. 2 is the plan view of the apparatus of FIG. 1, but with the shear arms in the further opened servicing position.

If, starting from the opened working position of the shear arms 11, 12 shown in FIG. 1, it is desired to have the shear blades 7 to 10 opened even further apart from one another, for example in order to work on the gob orifices or some other parts of the feeder bowl 4, then, as shown in FIG. 2, the piston rod 37 is retracted into the cylinder 36 and consequently the carriage 30 is moved downwards as viewed in FIG. 2. With the carriage 30 there also move the drives 24, 25 which are mounted fixedly on it, the movement continuing until the carriage reaches the lower end position indicated in FIG. 2 in which the shear arms 11, 12 take up a maximum opened servicing position. The maximum separation of the shear blades 7 to 10 from one another is naturally achieved if the crank pins 22, 23 maintain their outer dead point positions indicated in FIG. 1 during the displacement of the carriage 30 downwards, as this is viewed in FIG. 2.

When the necessary working on the apparatus 1 has been concluded, then, starting from the situation in FIG. 2, the piston rod 37 is extended again from the cylinder 36 and as a consequence the carriage 30 is displaced again into its upper end position as viewed in FIG. 1. This means that the shear arms 11, 12 again take up the opened working position shown in FIG. 1.

A similar sequence of events applies for the aforementioned opened safety position of the shear arms 11, 12.

What is claimed is:

1. Apparatus for the severing of glass gobs from one or more strands of molten glass, each strand having a longitudinal axis, said apparatus comprising:
   a pair of shear blades for effecting the severing of each gob;
   a pair of shear arms, each shear blade of said pair of blades arranged on a respective shear arm of said pair of shear arms;
   a common column on which said pair of shear arms are coaxially and freely pivotally mounted, said common column having a longitudinal axis; and
   a powered electric servodrive for pivotally driving said pair of shear arms in synchronism with each other, wherein each said shear arm has a separate said electric servodrive associated therewith.

2. Apparatus according to claim 1 wherein each said electric servodrive further comprises driven crank, and a coupling rod is coupled between a crank pin of each driven crank and the associated shear arm at a distance from the longitudinal axis of the column.

3. Apparatus according to claim 1 wherein each said powered electric servodrive is arranged on at least one carriage and wherein said carriage is displaceable in order to achieve a relative pivoting movement between the shear arms.

4. Apparatus according to claim 2 wherein each said powered electric servodrive is arranged on at least one carriage and wherein said carriage is displaceable in order to achieve a relative pivoting movement between the shear arms.

5. Apparatus according to claim 3 wherein said carriage is displaceable parallel to a plane extending through the longitudinal axis of the column and through the longitudinal axis of at least one strand.

6. Apparatus according to claim 4 wherein said carriage is displaceable parallel to a plane extending through the longitudinal axis of the column and through the longitudinal axis of at least one strand.

7. Apparatus according to claim 5 wherein said at least one carriage comprises a single carriage and each of the powered electric servodrive is arranged on said single carriage on respective opposite sides of said plane.

8. Apparatus according to claim 6 wherein said at least one carriage comprises a single carriage and each of said powered electric servodrive is arranged on said single carriage on respective opposite sides of said plane.

9. Apparatus according to claim 3 wherein each carriage is displaceable by means of at least one piston-cylinder unit which is connected between said at least one carriage and the apparatus.

10. An apparatus for severing glass gobs from at least one strand of molten glass, each strand having a longitudinal axis, said apparatus comprising:
    first and second shear blades;
    first and second shear arms, said first blade arranged on said first shear arm, said second blade arranged on said second shear arm;
    a common column on which said first and second shear arms are coaxially and pivotally mounted to be pivotally moveable about said column, said common column having a longitudinal axis; and
    a separate first and second electric servodrive coupled to each said shear arm to pivotally move said first and second shear arms, respectively, in synchronism with each other to sever the glass gobs.

11. An apparatus in accordance with claim 10 wherein said first and second electric servodrives drives a crank, and a coupling rod connecting said crank to its associated shear arm.

12. An apparatus in accordance with claim 10 wherein said first and second electric servodrives are arranged on a carriage, and said carriage is displaceable to achieve a relative pivoting movement of said first and second shear arms.

13. An apparatus in accordance with claim 10 wherein said first and second electric servodrives are arranged on at least one carriage, and said carriage is displaceable to achieve a relative pivoting movement of said first and second shear arms.

14. An apparatus in accordance with claim 12 wherein said carriage is displaceable parallel to a plane extending through the longitudinal axis of the column and through the longitudinal axis of said strand.

15. An apparatus in accordance with claim 10 wherein said first and second electric servodrives are arranged on a common carriage on opposite sides of a plane extending through the longitudinal axis of said column and through the longitudinal axis of said strand.

16. An apparatus in accordance with claim 12 further comprising a piston cylinder unit connected to each said carriage and to said apparatus to displace each said carriage.

17. An apparatus for moving at least one pair of cooperating shear blades to sever glass gobs from at least one strand of molten glass, each strand having a longitudinal axis, said apparatus comprising:

first and second shear arms, each said shear arm designed to hold at least one shear blade;

a common column on which said first and second shear arms are coaxially and pivotally mounted to be pivotally moved about said column, said common column having a longitudinal axis; and first and second drives associated with said first and second shear arms respectively to pivotally move said first and second shear arms in synchronism with each other, each said drive comprising an electric servodrive and a coupling rod, said rod having one end coupled to be moved by its associated said servodrive and another end coupled to move its associated said shear arm.

18. An apparatus in accordance with claim 17 further comprising:

a common carriage, said first and second drives arranged on said carriage on opposite sides of a plane extending through the longitudinal axis of said column and through the longitudinal axis of said strand.

* * * * *

UNITED STATES PATENT AND TRADEMARK OFFICE
CERTIFICATE OF CORRECTION

PATENT NO.     : 6,289,696 B1
DATED          : March 7, 1996
INVENTOR(S)    : Hermann Bögert and Gerhard Geisel It is certified that error appears in the above-identified patent and that said Letters Patent is hereby corrected as shown below:

<u>Title page,</u>
Item [73], "The Firm Herman Heye", should be -- The Firm Hermann Heye --

Signed and Sealed this

Twentieth Day of August, 2002

Attest:

Attesting Officer

JAMES E. ROGAN
*Director of the United States Patent and Trademark Office*